United States Patent [19]

Schmid et al.

[11] 4,291,919
[45] Sep. 29, 1981

[54] DEFLECTION FITTING FOR SAFETY BELTS FOR VEHICLES

[75] Inventors: Walter Schmid, Sindelfingen; Werner Breitschwerdt, Stuttgart; Guntram Huber, Aidlingen, all of Fed. Rep. of Germany

[73] Assignee: Daimler-Benz Aktiengesellschaft, Stuttgart, Fed. Rep. of Germany

[21] Appl. No.: 93,032

[22] Filed: Nov. 9, 1979

[30] Foreign Application Priority Data

Nov. 17, 1978 [DE] Fed. Rep. of Germany ....... 2849905

[51] Int. Cl.³ .............................................. B60R 21/10
[52] U.S. Cl. .............................. 297/483; 24/230 AK; 280/801; 280/808; 297/468
[58] Field of Search ............... 280/808, 807, 801, 802, 280/803, 804; 297/468, 469, 473, 482, 485, 483; 24/172, 173, 174, 198, 230 AK, 230 AL

[56] References Cited

U.S. PATENT DOCUMENTS

| 1,258,359 | 3/1918 | Pearson | 24/198 X |
| 3,038,229 | 6/1962 | Morton | 24/230 AL |
| 3,473,201 | 10/1969 | Hopka et al. | 24/230 AK |
| 3,891,274 | 6/1975 | Cook et al. | 297/483 |

Primary Examiner—John A. Pekar
Attorney, Agent, or Firm—Craig and Antonelli

[57] ABSTRACT

A deflection fitting for safety belts of motor vehicles, in which the opening for the lower belt is constructed as a belt guidance independent of the belt guidance for the chest belt and is arranged spatially separate therefrom while both belt guidances are arranged laterally spaced from the longitudinal center axis of the lock tongue, whereby both belt guidances are inclined with respect to one another and with respect to the longitudinal center axis of the lock tongue.

24 Claims, 7 Drawing Figures

DEFLECTION FITTING FOR SAFETY BELTS FOR VEHICLES

The present invention relates to a deflection fitting for safety belts for vehicles, especially for motor vehicles, with an elongated slot-like belt guidance for the belt band section of the chest belt and a similar passage for the belt band section of the lower belt as well as with a locking tongue adapted to be inserted into and locked in the belt lock.

Known deflection fittings for safety belts, especially three-point belts, consist of a buckle or catch with a center web. An approximately elongated slot-like belt guidance for extending therethrough the belt band section of the chest belt is formed above the web whereas an approximately similar opening for the passage of the belt band section for the lower belt is provided below the web. The belt guidance of the chest belt and the opening for the lower belt extend each transversely to the belt band extension of the chest belt, and thereby one below the other, as viewed in the direction of insertion of the lock tongue into the belt lock. The lock tongue extends below the lower opening and thus with its longitudinal center axis essentially at right angle to the transverse direction of this opening. This construction of the deflection fittings entails the disadvantage that the location of the belt lock can be made either in such a manner that the lower belt extends as favorably as possible, or also in such a manner that in lieu thereof, the chest belt extends as favorably as possible. In contrast thereto, it cannot be attained that both the lower belt as also the chest belt can each assume the most favorable course over the body of the vehicle passenger.

The present invention is concerned with the task to provide a deflection fitting of the type described above, which makes it possible to attain both for the lower belt as also for the chest belt the most favorable extension or course over the body of the vehicle passenger, whereby at the same time the prerequisites are created that a desired force distribution of lower belt to chest belt is predetermined by the deflection fitting, limited by the scope of the possibilities allowed by the friction of the belt band at the deflection fitting.

The underlying problems are solved according to the present invention with a deflection fitting of the type described above in that the opening for the lower belt is constructed as a belt guidance independent with respect to the belt guidance for the chest belt and spatially separate therefrom, and in that both belt guidances are arranged laterally adjacent and with a transverse spacing from the longitudinal center axis of the lock tongue extending in the insertion direction, whereby the belt guidance of the lower belt extends on one side of the longitudinal center axis of the lock tongue and the belt guidance of the chest belt on the other side thereof, and in that the belt guidances are inclined with respect to the longitudinal center axis of the lock tongue and with respect to one another with an inclined configuration directed approximately toward the lock tongue end.

It is achieved by the construction according to the present invention that the most favorable course of the belts over the body of the vehicle passenger, to be determined either theoretically or experimentally, can be realized both for the lower belt as also for the chest belt. The angles of inclination of the two separate belt guidances are constructed correspondingly. At the same time, the prerequisites are created for the possibility to achieve, for example, by an eccentric arrangement of the lock tongue, a predetermined desired force distribution of the lower belt to the chest belt within the scope of the possibilities allowed by the friction of the belt band at the deflection fitting.

The two belt guidances may thereby be arranged symmetrically to an axis of symmetry which itself may coincide with the longitudinal center axis of the lock tongue. In the alternative, an asymmetric arrangement of the longitudinal center axis of the lock tongue to the axis of symmetry and thus an asymmetric arrangement thereof with respect to the two belt guidances may be desirable to realize a predetermined force distribution between the lower belt and the chest belt. A particularly favorable arrangement can be attained if the belt guidances extend at different angles of inclination with respect to the longitudinal center axis of the lock tongue, which are chosen corresponding to the desired course of the lower belt and of the chest belt over the body of the passenger.

Accordingly, it is an object of the present invention to provide a deflection fitting for a safety belt for vehicles, especially for motor vehicles, which avoids by extremely simple means the aforementioned shortcomings and drawbacks encountered in the prior art.

Another object of the present invention resides in a deflection fitting for safety belts of vehicles, especially for motor vehicles, which permits a lay-out of the lower belt as also of the chest belt which is as favorable as possible in relation to the body of the vehicle passenger.

A further object of the present invention resides in a deflection fitting for safety belts of motor vehicles which permits a predetermined desired force distribution between lower belt and chest belt by the use of the novel deflection fitting in accordance with the present invention.

These and other objects, features and advantages of the present invention will become more apparent from the following description when taken in connection with the accompanying drawing which shows, for purposes of illustration only, several embodiments in accordance with the present invention, and wherein:

FIGS. 3 and 4 are partial cross-sectional views through two modified embodiments of a deflection fitting in accordance with the present invention; and FIGS. 5, 6, and 7 are schematic side views, on a reduced scale, of three further modified embodiments of a deflection fitting in accordance with the present invention.

Figure 1:
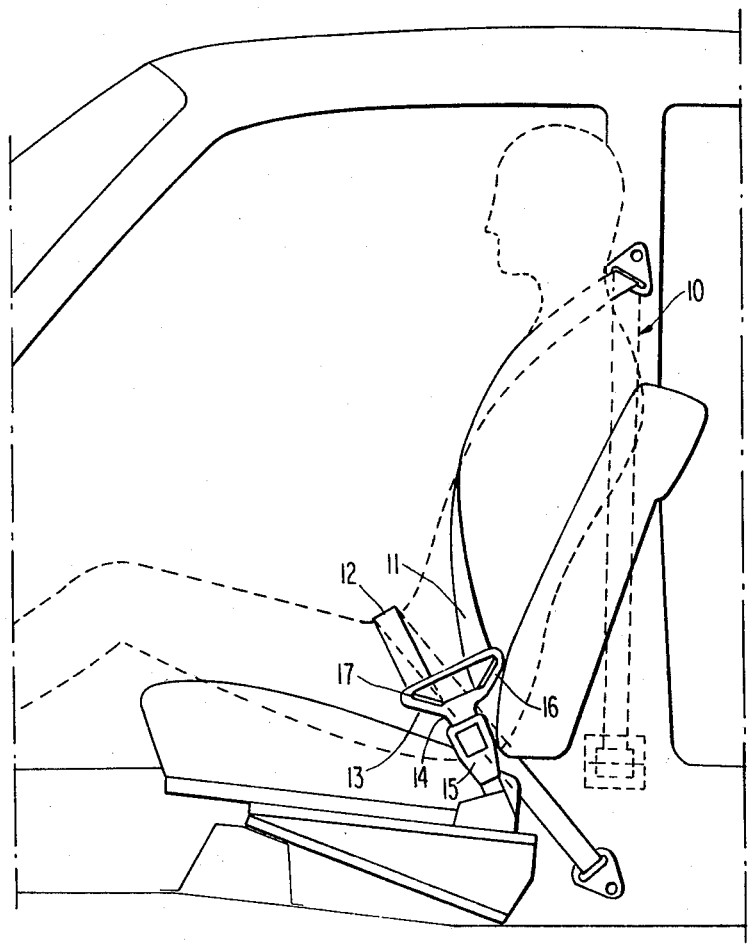
FIG. 1 is a schematic side view of a part of a motor vehicle with a passenger buckled by means of a three-point automatic safety belt in accordance with the present invention.

Referring now to the drawing wherein like reference numerals are used throughout the various views to designate like parts, the vehicle passenger illustrated in FIG. 1 is fastened by means of a three-point automatic safety belt generally designated by reference numeral 10 whose belt band section forming the chest belt 11 is guided starting from the right shoulder over the chest of the passenger and whose belt band section forming the lower belt 12 extends in the bottom area from the left toward the right, in relation to the passenger.

The chest belt 11 and the bottom belt 12 are guided by way of a deflection fitting 13 which at its downwardly pointing end according to FIG. 1, carries a lock tongue 14 adapted to be inserted into the belt lock 15 and locked therein. Details of the deflection fitting 13 according to a first embodiment can be seen in particular from FIG. 2. The deflection fitting 13 includes an elongated slot-like belt guidance 16 for the chest belt 11 and additionally a similar belt guidance 17 for the lower belt 12 which is independent with respect to the belt guidance 16 and spatially separate therefrom. In the illustration of FIG. 1, the fitting end of the chest belt 11 enters the coordinated belt guidance 16 on the side of the deflection fitting 13 pointing toward the passenger and leaves the belt guidance 16 on the side of the deflection fitting 13 opposite the passenger, which side is visible in FIG. 1. From there, the belt band proceeds to the left belt guidance 17 as viewed in FIG. 1, through which it is extended from the outside and toward the passenger.

As can be seen, both belt guidances 16 and 17 are arranged laterally adjacent and with a transverse spacing from the longitudinal center axis 18 of the lock tongue 14 which extends in the insertion direction. The belt guidance 16 for the chest belt 11 is thereby on one side, i.e., on the right side in FIG. 2, and the other belt guidance 17 for the lower belt 12 is on the other side of the longitudinal center axis 18, i.e., on the left side as viewed in FIG. 2. The belt guidances 16 and 17 are each inclined with respect to the longitudinal center axis 18 of the lock tongue 14 and with respect to each other with an inclined configuration directed approximately toward the free end of the lock tongue 14 pointing downwardly in FIG. 2.

This construction is common to all embodiments according to FIGS. 2 through 7.

In the first to the fourth embodiment according to FIGS. 2 through 5, the two belt guidances 16 and 17 are aligned symmetrically to one another with respect to an axis of symmetry, whereby the axis of symmetry in these embodiments coincides with the longitudinal center axis 18 of the lock tongue 14. Accordingly, the two belt guidances 16 and 17 extend in all four embodiments of FIGS. 2 through 5 with identical angles of inclination with respect to the longitudinal center axis 18 of the lock tongue 14, which are selected as example only with 45° and which are designated in the fourth embodiment according to FIG. 5 with $\alpha_1$ and $\beta_1$. However, these angles may differ from the angles shown in the various figures of the drawing.

In contradistinction thereto, in the fifth embodiment illustrated in FIG. 6, the longitudinal center axis 118 of the lock tongue 114 extends with a lateral transverse spacing e from the symmetry axis 119 and thus eccentrically and asymmetrically in relation to the two belt guidances 116 and 117. Both belt guidances 116 and 117 are thus positioned obliquely in relation to the longitudinal center axis 118 with the same or different angles of inclination $\alpha_2$ and $\beta_2$, whereby the angles of inclination $\alpha_2$ and $\beta_2$ in relation to the symmetry axis 119 are each identical and may also amount, for example, to 45°.

The sixth embodiment illustrated in FIG. 7 differs from the embodiments described hereinabove in that the belt guidances 216 and 217 extend with respect to the longitudinal center axis 218 of the lock tongue 214 with differently large angles of inclination $\alpha_3$ and $\beta_3$, of which the former may amount, for example, to 45° and the latter, for example, to 60°.

The indications for the angles of inclination given hereinabove are only given as examples. However, it is understood that the angle of inclination of the belt guidance 16, 116, 216 for the chest belt 11 and the angle of inclination of the belt guidance 17, 117, 217 for the lower belt 12 can be so determined and selected either theoretically or empirically that the most favorable course results both for the chest belt 11 as also for the bottom belt 12 in relation to the vehicle passenger. The same is also true as regards the arrangement of the lock tongue 14, 114, 214 by the asymmetric and eccentric arrangement of which, for example, according to FIGS. 6 and 7, a desired force distribution of the lower belt 12 to chest belt 11 can be attained within the scope of the possibilities allowed by the friction of the belt band at the deflection fitting.

Further constructive details of the deflection fitting 13 according to the first embodiment in FIG. 2 will be described hereinafter. The deflection fitting 13 includes a plate 23 with an approximately trapezoidally shaped contour. The projecting lock tongue 14 is arranged within the area of the shorter trapezoid base line, which is the lower one in FIG. 2. Longitudinal slots 26 and 27 are provided in the plate 23 within the area of the two trapezoidal inclined sides which extend approximately wedge-shaped toward the lock tongue 14, which longitudinal slots 26 and 27 form the belt guidances 16 and 17. The plate 23 is constructed as metallic core, with which the metallic lock tongue 14 is in one piece. The plate 23 is surrounded with a foamed synthetic resinous material 24 which is sympathetic to handling. As a result thereof, a handling safe against slippage is assured and at the same time the injury danger, for example, during an eventual impact on the deflection fitting 13 is reduced.

Figure 2:
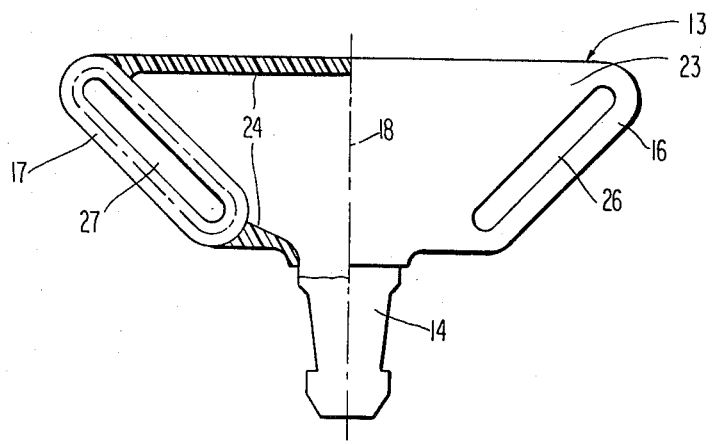
FIG. 2 is a side view, partly in cross section, of a deflection fitting of the safety belt according to the present invention.
Figure 2:
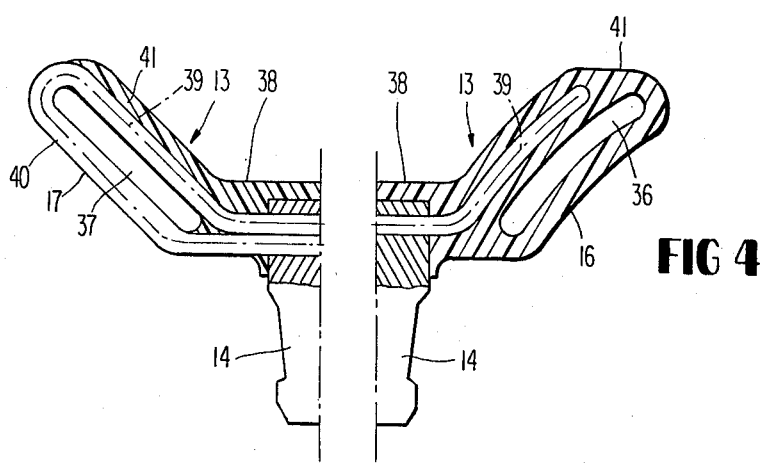
Figure 2:
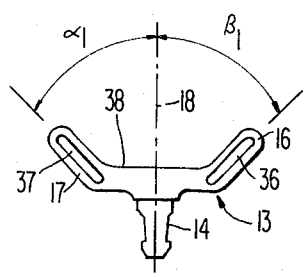
Figure 2:
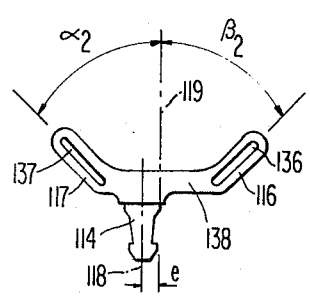
Figure 2:
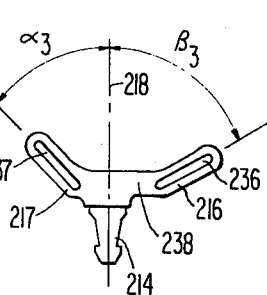

In contrast to the first embodiment according to FIG. 2, the second through sixth embodiments according to FIGS. 3 to 7 include an elongated eyelet 36, 37, respectively, 136, 137, respectively, 236, 237 for the formation of the belt guidances 16, 17, respectively, 116, 117, respectively, 216, 217, which are connected with each other within the area of their ends nearest one another, i.e., their lower ends in the drawings, by way of a support web 38, respectively, 138, respectively, 238, at which is arranged the lock tongue 14, respectively, 114, respectively, 214.

In the second embodiment illustrated in FIG. 3, the elongated eyelet 37 is formed by metal rods 39 and 40 bent into eyelet shape, which with their extensions are at the same time also part of the support web 38. The lock tongue 14 forms a separate metallic part, through which the metal rods 39 and 40 can extend in an anchoring manner. The metal rods 39 and 40 and the part of the lock tongue 14 retained in the support web 38 are embedded in synthetic plastic material 41 and are surrounded by the same by foaming.

In the third embodiment according to FIG. 4, the elongated eyelet 36 and also the support web 38 are formed of synthetic plastic material 41 which is reinforced by means of at least one inserted metal rod 39. The elongated eyelet 36 does not extend rectilinearly throughout its length as in the embodiments described before, but instead is slightly arcuately curved. Otherwise, the third embodiment according to FIG. 4 corresponds to the second embodiment of FIG. 3.

FIG. 1 illustrates how the deflection fitting 13 according to the first embodiment in FIG. 2 or that according to the remaining embodiments is effective in the proper use thereof. The construction enables both for the chest belt 11 as also for the bottom belt 12 the most favorable course over the body of the vehicle passenger.

Of course, it is also possible, contrary to the illustration in FIG. 1, to extend the chest belt through the lower eyelet and the bottom belt through the upper eyelet.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A deflection fitting for a safety belt for vehicles, the safety belt including a chest belt and a lower belt, the deflection fitting comprising a first belt guidance means for guiding a belt band section of one of the chest and the lower belt, a second belt guidance means for guiding a belt band section of the other of the chest and the lower belt, and a lock tongue means spaced from the first and second belt guidance means, the lock tongue means being adapted to be inserted into and locked in a belt lock means, characterized in that each of the belt guidance means are formed as an elongated slot, the second belt guidance means is independent of and spaced from the first belt guidance means, the first and second belt guidance means are arranged laterally of and at a transverse distance from a longitudinal center axis of the locked tongue means extending in an insertion direction thereof into the belt lock means, the first belt guidance means extends on one side of the longitudinal center axis of the lock tongue means and the second belt guidance means on the other side thereof, and in that each of the first and second belt guidance means are inclined with respect to and spaced from the center longitudinal axis of the lock tongue means and are inclined with respect to one another in such a manner that the chest belt and the lower belt assume a most favorable position on a user of the safety belt when the lock tongue means is locked in the belt lock means.

2. A deflection fitting according to claim 1, characterized in that said one belt is the chest belt and the other belt is the lower belt.

3. A deflection fitting according to claim 1, characterized in that the inclination of the belt guidance means is directed approximately toward an end of the lock tongue means.

4. A deflection fitting according to claim 1, 2 or 3, characterized in that the two belt guidance means are aligned symmetrically with respect to an axis of symmetry of the lock tongue means.

5. A deflection fitting according to claim 4, characterized in that the axis of symmetry coincides with the longitudinal center axis of the lock tongue means.

6. A deflection fitting according to claim 4, characterized in that the longitudinal center axis of the lock tongue means is laterally spaced from the axis of symmetry and thus extends eccentrically and asymmetrically with respect to the two belt guidance means.

7. A deflection fitting according to claim 1, 2 or 3, characterized in that each of the belt guidance means extend at different angles of inclination with respect to the longitudinal center axis of the lock tongue means.

8. A deflection fitting according to claim 1, 2 or 3, characterized in that a plate means with an approximately trapezoidally shaped contour is provided, the lock tongue means is arranged in and projects from an area of a shorter trapexoidal base line, the elongated slot means forming the first and second belt guidance means are contained in the plate means within an area of two trapezoidal inclined sides.

9. A deflection fitting according to claim 8, characterized in that the plate means includes a metallic core surrounded by a synthetic resinous material sympathetic to handling.

10. A deflecting fitting according to claim 8, characterized in that the two belt guidance means are aligned symmetrically with respect to an axis of symmetry of the lock tongue means.

11. A deflection fitting according to claim 10, characterized in that the axis of symmetry coincides with the longitudinal center axis of the lock tongue means.

12. A deflection fitting according to claim 10, characterized in that the longitudinal center axis of the lock tongue means is laterally spaced from the axis of symmetry and thus extends eccentrically and asymmetrically with respect to the two belt guidance means.

13. A deflection fitting according to claim 8, characterized in that each of the belt guidance means extend at different angles of inclination with respect to the longitudinal center axis of the lock tongue means.

14. A deflection fitting according to claim 1, 2 or 3, characterized in that each elongated slot is in the form of an elongated eyelet having a width corresponding to a width of the belt, a support web means is provided for connecting mutually nearest ends of the eyelets to each other, and in that the lock tongue means is arranged on the support web means.

15. A deflection fitting according to claim 14, characterized in that each elongated eyelet is formed by metal rods bent into eyelet shape, and in that the metal rods form a portion of the support web means.

16. A deflection fitting according to claim 15, characterized in that at least one of the metal rods and the lock tongue means are embedded in a synthetic plastic material and are surrounded thereby by foaming.

17. A deflection fitting according to claim 14, characterized in that each elongated eyelet and the support web means are made of a synthetic plastic material, and in that at least one embedded metal rod is arranged in the synthetic plastic material for reinforcing the same.

18. A deflection fitting according to claim 17, characterized in that the two belt guidance means are aligned symmetrically with respect to an axis of symmetry of the lock tongue means.

19. A deflection fitting according to claim 17, characterized in that the longitudinal center axis of the lock tongue means is laterally spaced from the axis of symmetry and thus extends eccentrically and asymmetrically with respect to the two belt guidance means.

20. A deflection fitting according to claim 17, characterized in that each of the belt guidance means extend at different angles of inclination with respect to the longitudinal center axis of the lock tongue means.

21. A deflection fitting according to claim 14, characterized in that the two belt guidance means are aligned symmetrically with respect to an axis of symmetry of the lock tongue means.

22. A deflection fitting according to claim 21, characterized in that the axis of symmetry coincides with the longitudinal center axis of the lock tongue means.

23. A deflection fitting according to claim 14, characterized in that the longitudinal center axis of the lock tongue means is latteraly spaced from the axis of symmetry and thus extends eccentrically and asymmetrically with respect to the two belt guidance means.

24. A deflection fitting according to claim 14, characterized in that each of the belt guidance means extend at different angles of inclination with respect to the longitudinal center axis of the lock tongue means.

* * * * *